US011985561B2

(12) United States Patent
Thanneeru et al.

(10) Patent No.: US 11,985,561 B2
(45) Date of Patent: *May 14, 2024

(54) LIMITING MOBILITY BETWEEN NETWORKS BASED ON CELL ID

(71) Applicant: T-MOBILE INNOVATIONS LLC, Overland Park, KS (US)

(72) Inventors: Suresh Thanneeru, Bothell, WA (US); Romil Sood, Bothell, WA (US)

(73) Assignee: T-Mobile Innovations LLC, Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/145,284

(22) Filed: Dec. 22, 2022

(65) Prior Publication Data

US 2023/0117232 A1    Apr. 20, 2023

Related U.S. Application Data

(63) Continuation of application No. 17/406,338, filed on Aug. 19, 2021, now Pat. No. 11,564,139.

(51) Int. Cl.
*H04W 36/14* (2009.01)
*H04W 36/00* (2009.01)
*H04W 48/02* (2009.01)

(52) U.S. Cl.
CPC ....... *H04W 36/14* (2013.01); *H04W 36/0079* (2018.08); *H04W 48/02* (2013.01)

(58) Field of Classification Search
CPC .. H04W 36/14; H04W 36/0079; H04W 48/02
See application file for complete search history.

(56) References Cited

U.S. PATENT DOCUMENTS

| | | | |
|---|---|---|---|
| 8,923,866 B2 * | 12/2014 | Tanaka | H04W 36/0055 370/235 |
| 9,066,268 B2 * | 6/2015 | Huang | H04W 12/08 |
| 9,143,498 B2 | 9/2015 | Sakura et al. | |
| 9,167,410 B1 | 10/2015 | Xue et al. | |
| 9,467,884 B2 * | 10/2016 | Gomes | H04W 36/36 |
| 9,661,537 B2 * | 5/2017 | Sander | H04W 36/385 |
| 9,763,146 B2 * | 9/2017 | Tietz | H04W 36/0094 |
| 10,136,365 B2 | 11/2018 | Xu et al. | |
| 11,284,313 B2 * | 3/2022 | Prasad | H04M 15/66 |
| 2010/0267373 A1 | 10/2010 | Engstrom | |
| 2011/0206011 A1 | 8/2011 | Ishida et al. | |
| 2012/0142337 A1 | 6/2012 | Wang et al. | |
| 2012/0264443 A1 | 10/2012 | Ng et al. | |
| 2013/0237225 A1 | 9/2013 | Martin | |

(Continued)

FOREIGN PATENT DOCUMENTS

AU    2012281288 B2 *    1/2015    ........... H04L 63/101

*Primary Examiner* — Ahmed Elallam
(74) *Attorney, Agent, or Firm* — Jones Robb, PLLC

(57) ABSTRACT

Restricting mobility between networks by identifying and rejecting incoming mobility events (e.g. handovers) from unknown cell sites based on a cellID included in a handover request. Core network nodes e.g. MME, AMF, SMF, can detect and reject the incoming mobility events by comparing Cell ID with a white list or referring to a database. This improves over current 3GPP specifications and network vendor implementations that support restriction policies on the source but not on the target.

20 Claims, 5 Drawing Sheets

(56) References Cited

U.S. PATENT DOCUMENTS

| | | | |
|---|---|---|---|
| 2016/0165502 A1* | 6/2016 | Sander | H04W 36/00835 |
| | | | 455/444 |
| 2019/0141586 A1 | 5/2019 | Olsson et al. | |
| 2019/0394683 A1* | 12/2019 | Sillanpaa | H04W 36/32 |
| 2020/0314701 A1 | 10/2020 | Talebi Fard et al. | |
| 2021/0160749 A1 | 5/2021 | Lu et al. | |
| 2022/0132332 A1 | 4/2022 | Zhang et al. | |

* cited by examiner

LIMITING MOBILITY BETWEEN NETWORKS BASED ON CELL ID

This patent application is a continuation of U.S. patent application Ser. No. 17/406,338, filed on Aug. 19, 2021, which is incorporated by reference in its entirety for all purposes.

TECHNICAL BACKGROUND

As communication networks evolve and grow, there are ongoing challenges in communicating data across different types of networks. Different types of networks can include wireless networks, packet-switched networks such as the internet, satellite networks, public/private networks, local area networks (LANs), wide area networks (WANs), and any network enabling communication between different types of electronic devices. Other types of communication networks in various combinations may be envisioned by those having ordinary skill in the art in light of this disclosure. One type of communication network described herein includes telecommunications networks, such as 5G New Radio (NR) networks, 4G LTE networks, etc. Such networks utilize specialized devices, such as gateways, routers, switches, etc. that enable communication between sub-network types, such as radio access networks (RANs), core networks, and so on, as further described herein. For example, consumer wireless devices (e.g. cellular telephones, smartphones, tablets, etc.) can attach to radiofrequency (RF) carriers deployed by access nodes within a coverage area of a RAN, and exchange data transmissions and signals between core network components, public data networks, and other combinations of networks and wireless devices. However, there exist issues with handovers and mobility of wireless devices between different types of networks and carriers deployed therefrom. For example, information shared between networks to facilitate handovers can be exploited by malicious network elements or operators.

OVERVIEW

Examples described herein include methods and systems for restricting mobility between networks based on cellular identifiers (cellID). An example method described herein includes receiving, at a first core network node associated with a first radio access network (RAN), a first handover request from a second core network node associated with a second RAN, the first handover request being for a first wireless device on the second RAN, determining, by the first core network node, that a first cell identifier in the first handover request does not match a whitelist of cell identifiers stored on the first core network node, and rejecting the first handover request.

An example system described herein includes a first core network node associated with a first network and a processor communicably coupled to the first core network node. The processor enables the first core network node to perform operations comprising receiving a first handover request for a wireless device from a second core network node associated with a second network, determining that a first cell identifier in the first handover request does not match a whitelist of cell identifiers stored on the first core network node, and rejecting the first handover request.

An example processing node for limiting mobility includes a processor and a memory that enable the processing node to perform operations including receiving, at a first core network node associated with a first radio access network (RAN), a first handover request from a second core network node associated with a second RAN, the first handover request being for a first wireless device on the second RAN, determining, by the first core network node, that a first cell identifier in the first handover request does not match a whitelist of cell identifiers stored on the first core network node, and rejecting the first handover request.

DETAILED DESCRIPTION

Methods and systems for restricting mobility between networks can identify and reject incoming mobility events (e.g. handovers) from unknown cell sites based on a cellular identifiers (e.g. cellID). The cellID can be included in a handover request, and core network node on a destination network, such as mobility management entity (MME) in 4G LTE networks, or access and mobility function (AMF) in 5G NR networks, can be configured to detect and reject the incoming mobility events by comparing with a white list or referring to a database. This provides an improvement over current 3GPP specifications and network vendor implementations, which support certain restriction policies on the source side, but not on the target side.

Therefore, a method described herein for restricting mobility includes receiving, at a first core network node associated with a first radio access network (RAN), a first handover request from a second core network node associated with a second RAN, the first handover request being for a first wireless device on the second RAN, determining, by the first core network node, that a first cell identifier in the first handover request does not match a whitelist of cell identifiers stored on the first core network node, and rejecting the first handover request. In examples described herein, the first and second RANs can be on the same or different networks. Further, cell IDs in handover requests may be associated with different tracking areas or coverage areas of each RAN. Thus, network operators can use this method to carve out portions of service areas that are "allowed" or white-listed for mobility of wireless devices. This can be useful for enterprise tracking areas, network slicing, etc. Further, the whitelist can be provided to the first core network node by one or more network operators or shared between the first and second core network nodes. While handovers may be allowed at other network nodes based on other factors (signal levels, home subscriber servers, etc.), the disclosed operations enable preventing handovers at specific core network nodes, such as mobility management entities (MME) or access and mobility functions (AMF).

Figure 1:
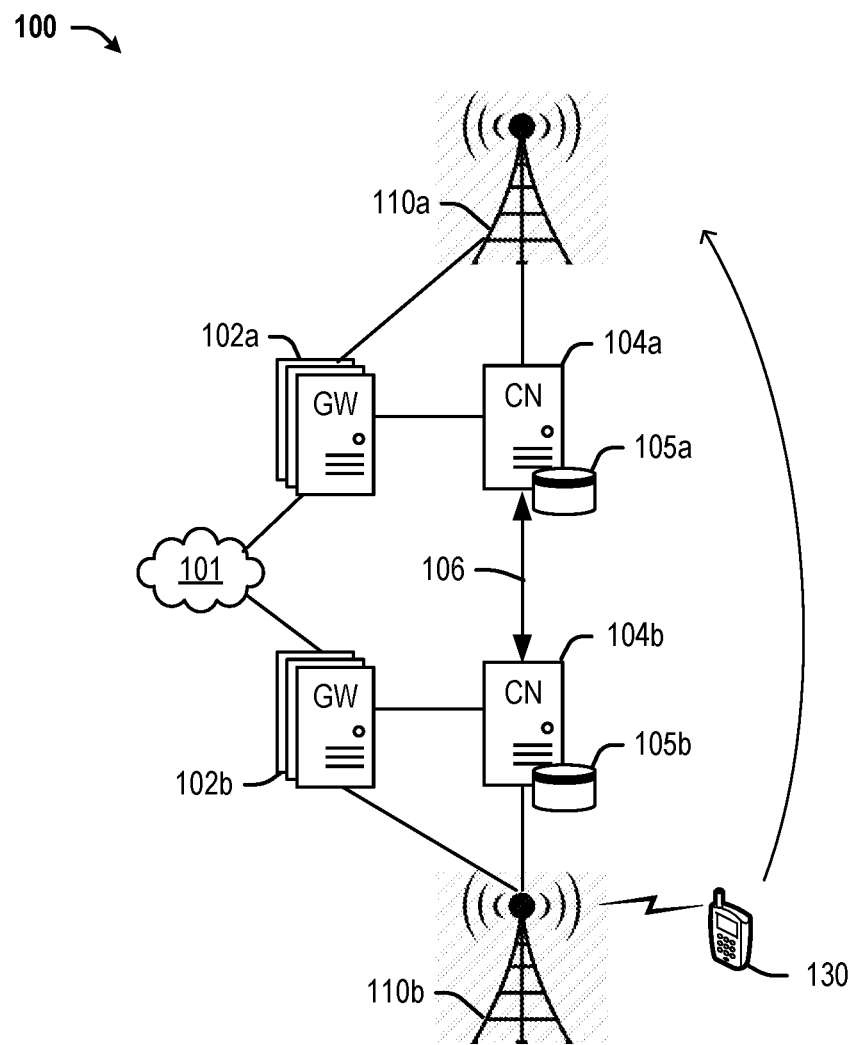
FIG. 1 depicts an example of a system for limiting mobility between networks.

FIG. 1 depicts a system 100 comprising a communication network 101, gateways 102a and 102b, controller nodes 104a and 104b, access nodes 110a and 120b, and wireless device 130. Access nodes 110a/b can be part of different radio access networks (RAN). In one example, access nodes 110*a/b* may be macrocell access nodes configured to deploy one or more wireless air interfaces to which wireless device 130 can respectively attach and access network services from network 101. For example, access nodes 110*a/b* can include an eNodeB, or a gNodeB, and is configured to deploy a wireless air interface one or more radio access technologies (RATs) such as 4G LTE and/or 5G NR. Each RAT can be configured to utilize a different frequency band or sub-band, a different channel size or bandwidth, and so on. Further, controller nodes 104*a/b* and gateways 102*a/b* can respectively each be associated with the different RANs containing access nodes 110*a/b*. For example, controller node 104*a* and gateway 102*a* can be part of a first core network associated with access node 110*a*, and controller node 104*b* and gateway 102*b* can be part of a second core network associated with access node 110*b*. In a 4G LTE network, controller node 104*a/b* can be a mobility management function (MMF) and gateways 102*a/b* can be one or more serving gateways (S-GW), packet gateways (P-GW), and so on. Conversely, in a 5G NR network, controller node 104*a/b* can be an access and mobility session management (AMF) and/or session management function (SMF), and gateways 102*a/b* can be one or more user plane functions (UPF). Hereinafter, the term "core network node" can be used to refer to any combination of MME, SMF, AMF, gateway(s), etc., and are not limited to a specific network implementation. Although only access nodes 110*a/b*, controller nodes 104*a/b*, gateways 102*a/b*, and wireless device 130 are illustrated in FIG. 1, system 100 can include various other combinations of core network nodes carriers/wireless air interfaces, antenna elements, access nodes, and wireless devices, as may be evident to those having ordinary skill in the art in light of this disclosure.

In an exemplary embodiment, system 100 is further configured to identify and reject incoming mobility events, such as a handover of wireless device 130 from access node 110*b* to access node 110*a*. For example, access node 110*b* may be in a coverage area that is not supported by access node 110*a* (and/or networks associated therewith). In one example, a whitelist stored on data store 105*a* can contain a plurality of cellular identifiers (e.g. cellID) associated with of known or supported cell sites, access nodes, or networks. Each incoming handover request can include an identifier of a source cell, and identified by referring to the whitelist. If there is no match, the incoming handover request (or related mobility event) is rejected.

For example, a method performed by one or more network nodes within system 100 can include receiving, at a first core network node (e.g. controller node 104*a*) associated with a first RAN (e.g. first RAN comprising access node 110*a*), a first handover request from a second core network node (e.g. controller node 104*b*) associated with a second RAN (e.g. second RAN comprising access node 110*b*). The handover request can be for a wireless device 130 on the second RAN (e.g. attached to access node 110*b*), determining, by the first core network node (e.g. controller node 104*a*), that a first cell identifier in the handover request does not match a whitelist of cell identifiers stored thereon, and rejecting the handover request.

Although separate, the first and second RANs can be on the same or different networks, e.g. as part of a heterogeneous network with a large enough geographic area to require different core network elements. Further, cell IDs in handover requests may be associated with different tracking areas or coverage areas of each RAN. Thus, network operators can use this method to carve out portions of service areas that are "allowed" or white-listed for mobility of wireless devices. This can be useful for enterprise tracking areas, network slicing, etc. Further, the whitelist can be provided to the first core network node (e.g. controller node 104*a*) by one or more network operators, or shared between the first and second core network nodes (e.g. by virtue of being stored on data store 105*b* or any other network node in communication with core network nodes 104*a/b*).

Access nodes 110*a/b* can be any network node configured to provide communication between wireless device 130 and communication network 101, including standard access nodes and/or short range, low power, small access nodes. For instance, access nodes 110*a/b* may include any standard access node, such as a macrocell access node, base transceiver station, a radio base station, next generation or gigabit NodeBs (gNBs) in 5G networks, or enhanced eNodeBs (eNBs) in 4G/LTE networks, or the like. In an exemplary embodiment, a macrocell access node can have a coverage area in the range of approximately five kilometers to thirty five kilometers and an output power in the tens of watts. In other embodiments, access nodes 110*a/b* can be a small access node including a microcell access node, a picocell access node, a femtocell access node, or the like such as a home NodeB or a home eNodeB device. Moreover, it is noted that while access nodes 110*a/b* are illustrated in FIG. 1, any number of access nodes can be implemented within system 100.

Access nodes 110*a/b* can comprise processors and associated circuitry to execute or direct the execution of computer-readable instructions to perform operations such as those further described herein. Briefly, access nodes 110*a/b* can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access nodes 110*a/b* can receive instructions and other input at a user interface. Access nodes 110*a/b* communicate with gateway nodes 102*a/b* and controller nodes 104*a/b* via various communication links and interfaces further described herein. Access nodes 110*a/b* may communicate with each other (and with other access nodes not shown herein) using a direct link such as an X2 link or similar.

Wireless device 130 may be any device, system, combination of devices, or other such communication platform capable of communicating wirelessly with access nodes 110*a/b* using one or more frequency bands deployed therefrom. Wireless device 130 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data via access nodes 110*a/b*. Other types of communication platforms are possible.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless device 130. Wireless network protocols can comprise MBMS, code division multiple access (CDMA)

1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), Worldwide Interoperability for Microwave Access (WiMAX), Fourth Generation broadband cellular (4G, LTE Advanced, etc.), and Fifth Generation mobile networks or wireless systems (5G, 5G New Radio ("5G NR"), or 5G LTE). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links used within system 100 can include various communication media, such as air, space, metal, optical fiber, or some other signal propagation path—including combinations thereof. The communication links can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), Long Term Evolution (LTE), 5G NR, or combinations thereof. Communication links can also include proprietary or standardized interfaces, such as S1, S5, S6 . . . etc. interfaces. Other wireless protocols can also be used. Communication links can be a direct link or might include various equipment, intermediate components, systems, and networks. Communication links may comprise many different signals sharing the same link. Communication links may be associated with many different reference points, such as N1-Nxx, as well as S1-Sxx, etc. In one example, core network nodes 104a and 104b can communicate over a communication link 106 that comprises a N26 interface, or equivalent. N26 is an inter-control-node interface between AMF and MME to enable interworking between the 4G LTE and 5G NR core networks. Interworking procedures using the N26 interface enable the exchange of mobility management and session management states between the source and target networks (e.g. between access node 110b and 110a), including handover procedures.

Gateway nodes 102a/b can be any network node configured to interface with other network nodes using various protocols. Gateway nodes 102a/b can communicate user data over system 100. Gateway nodes 102a/b can be a standalone computing device, computing system, or network component, and can be accessible, for example, by a wired or wireless connection, or through an indirect connection such as through a computer network or communication network. For example, gateway nodes 102a/b can include a serving gateway (SGW), a public data network gateway (PGW), and/or a systems architecture evolution gateway (SAE-GW) associated with 4G LTE networks, or a user plane function (UPF) associated with 5G NR networks. One of ordinary skill in the art would recognize that gateway nodes 102a/b is not limited to any specific technology architecture, such as Long Term Evolution (LTE) or 5G NR, and can be used with any network architecture and/or protocol.

Gateway nodes 102a/b can comprise a processor and associated circuitry to execute or direct the execution of computer-readable instructions to obtain information. Gateway nodes 102a/b can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway nodes 102a/b can receive instructions and other input at a user interface.

Controller nodes 104a/b can be any network node configured to communicate information and/or control information over system 100. Controller nodes 104a/b can be configured to transmit control information associated with a mobility event, e.g. a handover. Controller nodes 104a/b can be a standalone computing device, computing system, or network component, and can be accessible, for example, by a wired or wireless connection, or through an indirect connection such as through a computer network or communication network. For example, controller nodes 104a/b can include a mobility management entity (MME), a control gateway (SGW-C or PGW-C), a session management function (SMF), access and mobility function (AMF), a home subscriber server (HSS), a policy control and charging rules function (PCRF), an authentication, authorization, and accounting (AAA) node, a rights management server (RMS), a subscriber provisioning server (SPS), a policy server, etc. One of ordinary skill in the art would recognize that controller nodes 104a/b is not limited to any specific technology architecture, such as Long Term Evolution (LTE) or 5G NR, and can be used with any network architecture and/or protocol.

Controller nodes 104a/b can comprise a processor and associated circuitry to execute or direct the execution of computer-readable instructions to obtain information. Controller nodes 104a/b can retrieve and execute software from storage, which can include a disk drive, a flash drive, memory circuitry, or some other memory device, and which can be local or remotely accessible. In an exemplary embodiment, each controller node 104a/b respectively includes a database 105a/b for storing information, such as whitelists, cell IDs associated with access nodes 110a and 110b (and other access nodes within system 100), and so on. This information may be requested by or shared with access nodes 110a/b via communication links 106, 107, X2 connections, and so on. The software comprises computer programs, firmware, or some other form of machine-readable instructions, and may include an operating system, utilities, drivers, network interfaces, applications, or some other type of software, and combinations thereof. Controller nodes 104a/b can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access nodes 110a/b and communication network 101.

Further, the methods, systems, devices, networks, access nodes, and equipment described herein may be implemented with, contain, or be executed by one or more computer systems and/or processing nodes. The methods described above may also be stored on a non-transitory computer readable medium. Many of the elements of communication system 100 may be, comprise, or include computers systems and/or processing nodes, including access nodes, controller nodes, and gateway nodes described herein. In some examples, a processing node may comprise (or be communicatively coupled to) a core network node, such as controller node(s) 104a/b.

Figure 2:
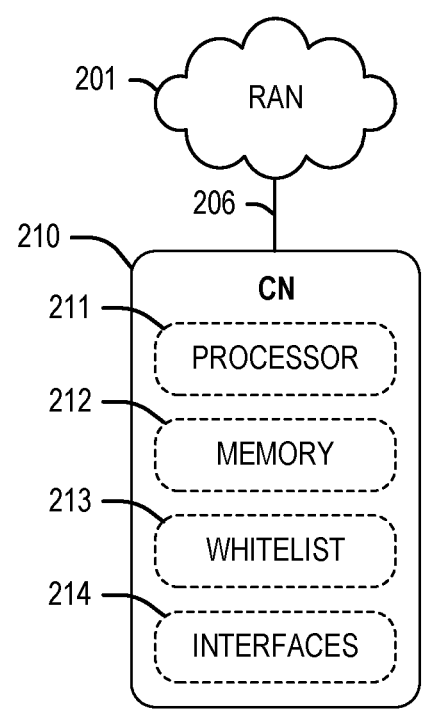
FIG. 2 depicts an example controller node for limiting mobility between networks.

FIG. 2 depicts an exemplary controller node 200 for limiting mobility between networks. Controller node comprises a processor 211, a memory 212, a whitelist 213, and interfaces 214. Processor 211 can include a central processing unit (CPU), and memory 212 can include a disk drive, flash drive, memory circuitry, or other memory device. Memory 212 can store computer programs, firmware, or some other form of machine-readable instructions, including an operating system, utilities, drivers, network interfaces, applications, or some other type of software. Further, memory 212 can store software or computer-readable instructions that can be executed to perform the operations described herein. For example, memory 212 can include instructions for matching a whitelist 213 of cell identifiers stored on the controller node 210, and rejecting a handover request that does not include a whitelisted cell identifier. Since cell IDs in handover requests may be associated with different tracking areas or coverage areas of each RAN, network operators can use this method to carve out portions of service areas that are "allowed" or white-listed for mobility of wireless devices. The whitelist 213 can be provided to the controller node 210 by one or more network operators or shared by another core network node. As described herein, core network node 210 can include a one or more of a MME, AMF, or equivalent. Thus, interfaces 214 can be associated with different reference points, such as N1-Nxx, as well as S1-Sxx, X2, etc., or any interface enabling controller node 210 to communicate with other network elements. Controller node 210 may further include other components such as a power management unit, a control interface unit, user interface, etc., which are omitted for clarity.

Figure 3:
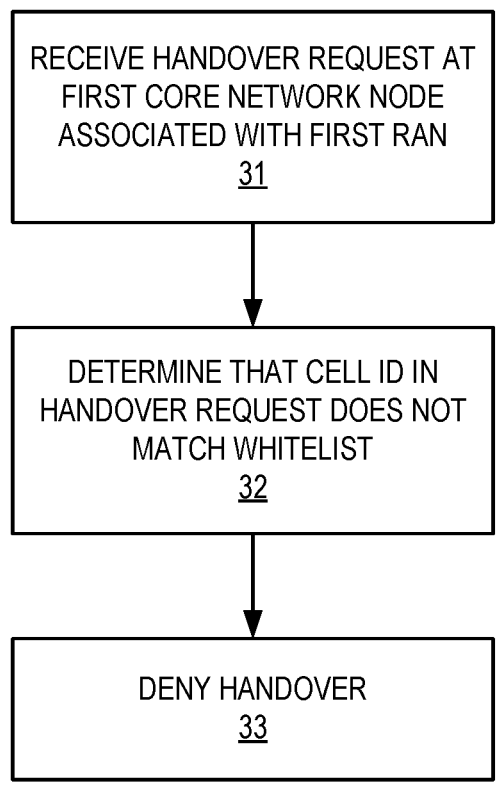
FIG. 3 depicts an example of a method for limiting mobility between networks.

FIG. 3 depicts an exemplary method for limiting mobility in wireless networks. The operations of FIG. 3 may be performed by one or more processing nodes or core network nodes. Although FIG. 3 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 31, a handover request is received at a first core network node associated with a first RAN. In an example, the handover request can be any mobility event associated with a handover or a request to handover a wireless device from a second RAN to the first RAN associated with the first core network node. A cellular identifier (e.g. CellID) can be included in the handover request, and at 32, the core network node (e.g. MME or AMF) can be configured to determine that the cell identifier does not match a whitelist and, at 33, reject or deny the incoming mobility events. The first and second RANs can be on the same or different networks. Further, cell IDs in handover requests may be associated with different tracking areas or coverage areas of each RAN. Thus, network operators can use this method to carve out portions of service areas that are "allowed" or white-listed for mobility of wireless devices. This can be useful for enterprise tracking areas, network slicing, etc. Further, the whitelist can be provided to the first core network node by one or more network operators or shared between the first and second core network nodes. While handovers may be allowed at other network nodes based on other factors (signal levels, home subscriber servers, etc.), the disclosed operations enable preventing handovers at specific core network nodes.

Conversely, a second handover request can be received at the core network node from a second core network node. The second handover request can be associated with a second wireless device that is from a tracking area or cell ID that is authorized or allowed. In this case, the core network node (e.g. MME or AMF depending on network implementation) can determine that the cell identifier in the second handover request matches the whitelist of cell identifiers stored on the core network node, and accept/allow the second handover request. Accepting the second handover request can also include updating other core network nodes that the second handover request was accepted.

Figure 4:
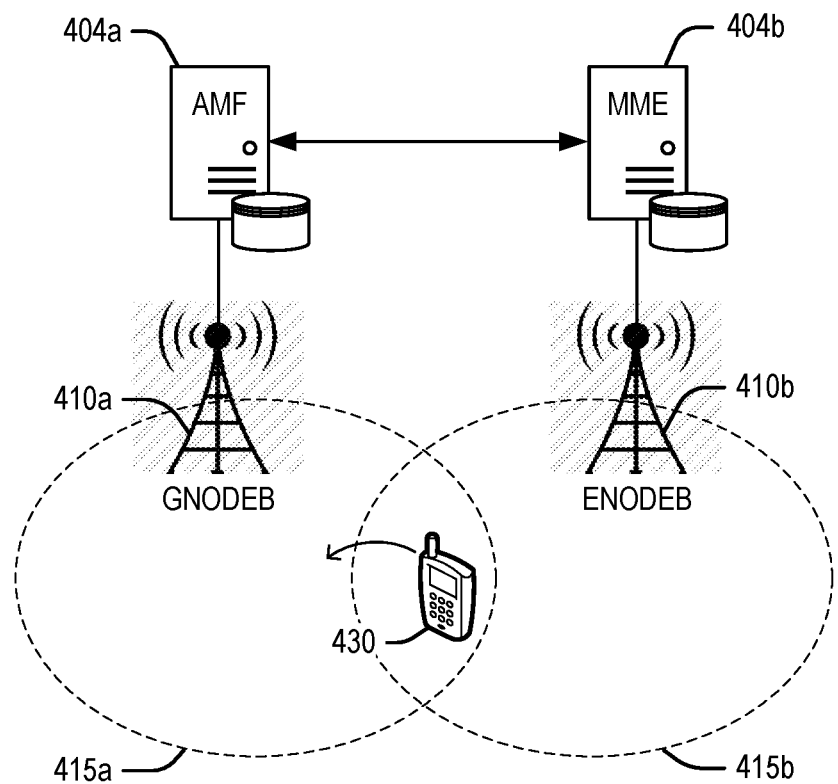
FIG. 4 depicts an example of limiting mobility between networks using different RATs.

FIG. 4 depicts exemplary limitation on mobility from a 4G LTE network to a 5G NR network. Controller nodes 404a and 404b are respectively coupled to access nodes 410a and 420b, and wireless device 430 is illustrated as moving into a coverage area 415a associated with access node 410a from a coverage area 415b associated with access node 410b. Access nodes 410a/b can be part of different radio access networks (RAN). In this example, access node 410a comprises a gNodeB, and is therefore coupled to an AMF 404a. Further, access node 410b comprises a eNodeB, and is therefore coupled to a MME 404b. Each access node 410a/b may be a macrocell access node configured to deploy one or more wireless air interfaces to which wireless device 430 can respectively attach.

In this example, AMF 404a is configured to identify and reject incoming mobility events, such as a handover of wireless device 430 from access node 410b to access node 410a. For example, access node 410b may be in a coverage area 415b that is not supported by access node 410a (and/or networks associated therewith). In one example, a whitelist stored on AMF 404a can contain a plurality of cellular identifiers (e.g. cellID) associated with of known or supported cell sites, access nodes, or networks. Each incoming handover request can include an identifier of a source cell, and identified by referring to the whitelist. If there is no match, the incoming handover request (or related mobility event) is rejected. The handover information (or any mobility event information) can be transmitted from MME 404b to AMF 404a via a communication link 406, which can comprise a N26 interface or equivalent. Further, cell IDs in handover requests may be associated with different tracking areas or coverage areas of each RAN. Thus, network operators can use this method to carve out portions of service areas that are "allowed" or white-listed for mobility of wireless devices.

Figure 5:
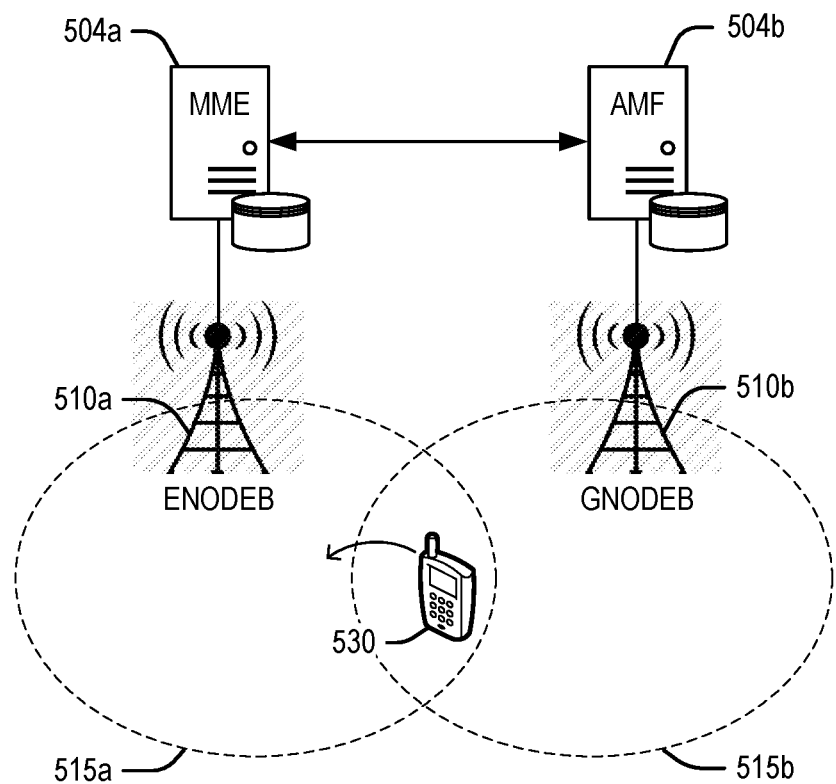
FIG. 5 depicts another example of limiting mobility between networks using different RATs.

FIG. 5 depicts exemplary limitation on mobility from a 4G LTE network to a 5G NR network. Controller nodes 504a and 504b are respectively coupled to access nodes 510a and 520b, and wireless device 530 is illustrated as moving into a coverage area 515a associated with access node 510a from a coverage area 515b associated with access node 510b. Access nodes 510a/b can be part of different radio access networks (RAN). In this example, access node 510a comprises a eNodeB, and is therefore coupled to an MME 504a. Further, access node 510b comprises a eNodeB, and is therefore coupled to a AMF 504b. Each access node 510a/b may be a macrocell access node configured to deploy one or more wireless air interfaces to which wireless device 530 can respectively attach.

In this example, MME 504a is configured to identify and reject incoming mobility events, such as a handover of wireless device 530 from access node 510b to access node 510a. For example, access node 510b may be in a coverage area 515b that is not supported by access node 510a (and/or networks associated therewith). In one example, a whitelist stored on MME 504a can contain a plurality of cellular identifiers (e.g. cellID) associated with of known or supported cell sites, access nodes, or networks. Each incoming handover request can include an identifier of a source cell, and identified by referring to the whitelist. If there is no match, the incoming handover request (or related mobility event) is rejected. The handover information (or any mobility event information) can be transmitted from AMF 504b to MME 504a via a communication link 506, which can comprise a N26 interface or equivalent. Further, cell IDs in handover requests may be associated with different tracking areas or coverage areas of each RAN. Thus, network operators can use this method to carve out portions of service areas that are "allowed" or white-listed for mobility of wireless devices.

The exemplary embodiments described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

The invention claimed is:

1. A method, comprising:
receiving, at a first core network node associated with a first radio access network (RAN), a first handover request from a second core network node associated with a second RAN, the first handover request being for a first wireless device on the second RAN, the first handover request including a first cell identifier identifying a source cell site associated with the second core network node;
determining, by the first core network node, that the first cell identifier in the first handover request matches an allowed list of cell identifiers stored on the first core network node, the cell identifiers on the allowed list identifying supported source cell sites; and
accepting the first handover request.

2. The method of claim 1, wherein the first RAN is configured to utilize a first radio access technology (RAT), and the second RAN is configured to utilize a second radio access technology (RAT).

3. The method of claim 2, wherein the first RAT comprises 5G, and the second RAT comprises any of 4G, 5G, or 6G.

4. The method of claim 3, wherein the first core network node comprises any of an access and mobility management function (AMF) or a mobility management entity (MME).

5. The method of claim 3, wherein the second core network node comprises any of an access and mobility management function (AMF) or a mobility management entity (MME).

6. The method of claim 2, wherein the first RAT comprises 4G, and the second RAT comprises any of 4G, 5G, or 6G.

7. The method of claim 6, wherein the first core network node comprises any of an access and mobility management function (AMF) or a mobility management entity (MME).

8. The method of claim 6, wherein the second core network node comprises any of an access and mobility management function (AMF) or a mobility management entity (MME).

9. The method of claim 1, further comprising:
receiving, at the first core network node, a second handover request from the second core network node, the second handover request associated with a second wireless device on the second RAN;
determining, by the first core network node, that a second cell identifier in the second handover request does not match the allowed list of cell identifiers stored on the first core network node; and
rejecting the second handover request.

10. The method of claim 9, wherein rejecting the second handover request comprises updating other core network nodes that the second handover request was rejected.

11. A system, comprising
a target core network node associated with a target network operator; and
a processor communicably coupled to the target core network node, the processor for enabling the target core network node to perform operations comprising:
receiving a first handover request for a wireless device from a source core network node associated with a source network operator, the first handover request including a first cell identifier identifying a source cell site associated with the source core network node;
determining that the first cell identifier in the first handover request matches an allowed list of cell identifiers stored on the target core network node, the cell identifiers on the allowed list identifying supported source cell sites; and
accepting the first handover request.

12. The system of claim 11, wherein the target network operator is configured to utilize a first radio access technology (RAT), and the source network operator is configured to utilize a second radio access technology (RAT).

13. The system of claim 12, wherein the first RAT comprises 5G, and the second RAT comprises any of 4G, 5G, or 6G.

14. The system of claim 13, wherein the target core network node comprises any of an access and mobility management function (AMF) or a mobility management entity (MME).

15. The system of claim 13, wherein the source core network node comprises any of an access and mobility management function (AMF) or a mobility management entity (MME).

16. The system of claim 12, wherein the first RAT comprises 4G, and the second RAT comprises any of 4G, 5G, or 6G.

17. The system of claim 16, wherein the target core network node comprises any of an access and mobility management function (AMF) or a mobility management entity (MME).

18. The system of claim 16, wherein the source core network node comprises any of an access and mobility management function (AMF) or a mobility management entity (MME).

19. A processing node for limiting mobility, the processing node comprising a processor and a memory that enable the processing node to perform operations comprising:
receiving, at a first core network node associated with a first radio access network (RAN), a first handover request from a second core network node associated with a second RAN, the first handover request being for a first wireless device on the second RAN, the first handover request including a first cell identifier identifying a source cell site associated with the second core network node;
determining, by the first core network node, that the first cell identifier in the first handover request does not match an allowed list of cell identifiers, the cell identifiers on the allowed list identifying supported source cell sites associated with a tracking area of the first RAN stored on the first core network node; and
rejecting the first handover request.

20. The processing node of claim 19, wherein the first and second core network nodes are communicatively coupled via a N26 interface.

\* \* \* \* \*